Aug. 2, 1955  J. HOLZER  2,714,213
PLURAL WORK HOLDERS RETRACTABLE ONLY UPON FULLY
ADVANCED POSITION OF EACH WORK HOLDER
Filed April 23, 1953  3 Sheets-Sheet 1
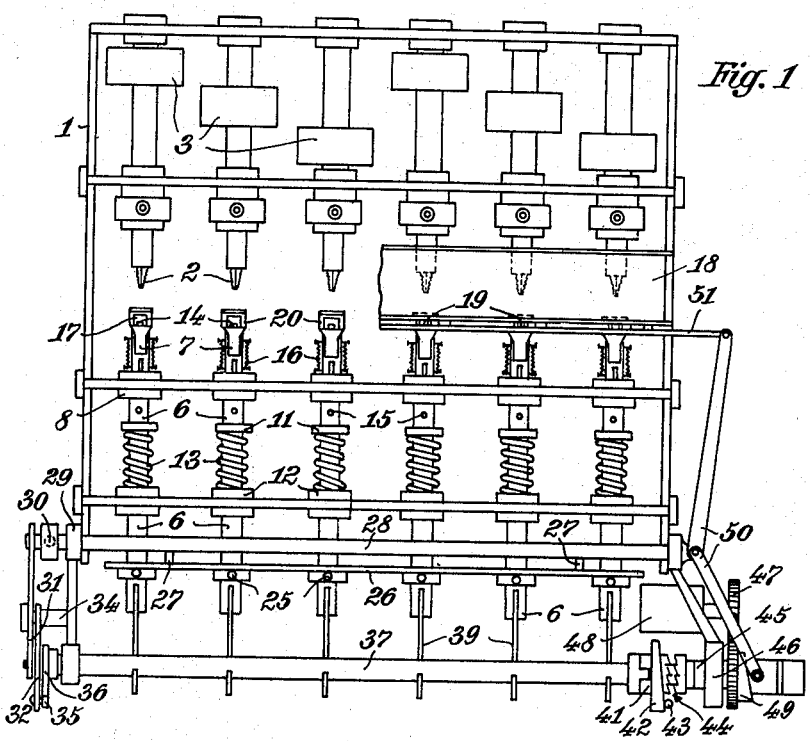
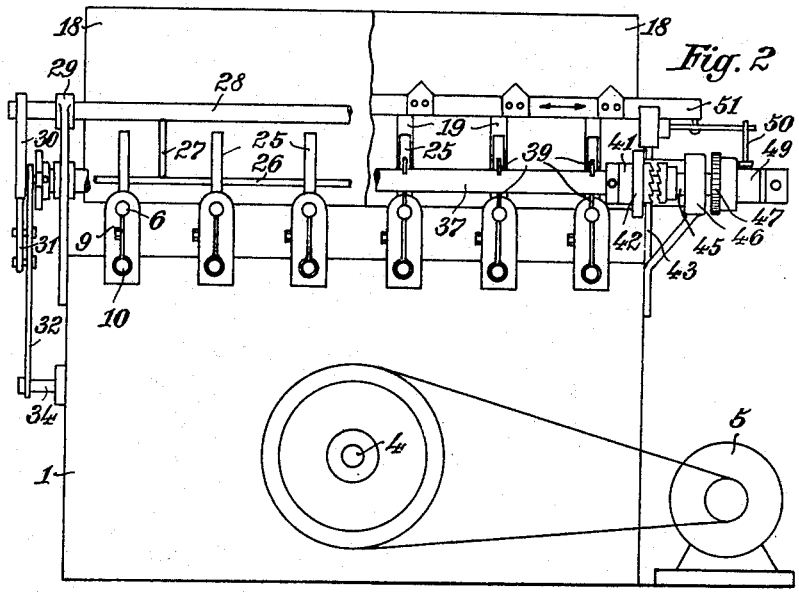
Inventor
Josef Holzer
By:
Attorney Inventor
Josef Holzer
By: [signature]
Attorney Aug. 2, 1955 J. HOLZER 2,714,213
PLURAL WORK HOLDERS RETRACTABLE ONLY UPON FULLY
ADVANCED POSITION OF EACH WORK HOLDER
Filed April 23, 1953 3 Sheets-Sheet 3
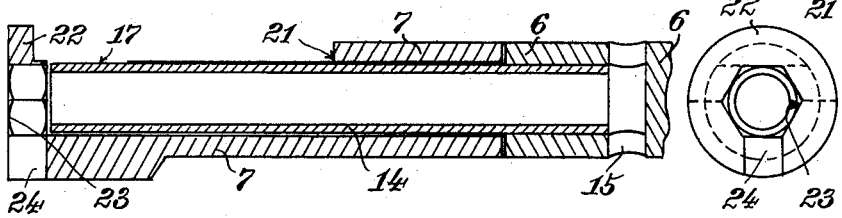
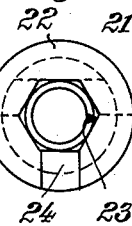
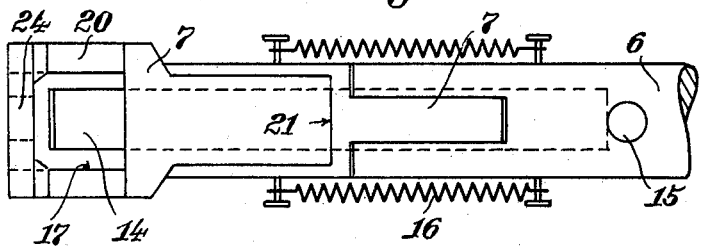
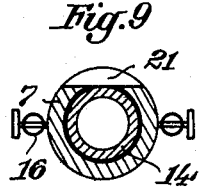
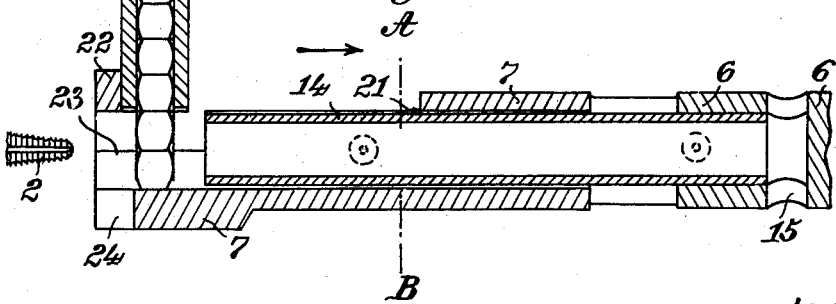
Inventor
Josef Holzer
By
Attorney United States Patent Office 2,714,213
Patented Aug. 2, 1955

2,714,213

PLURAL WORK HOLDERS RETRACTABLE ONLY UPON FULLY ADVANCED POSITION OF EACH WORK HOLDER

Josef Holzer, Oberharmersbach/Schwarzwald, Germany

Application April 23, 1953, Serial No. 350,545

12 Claims. (Cl. 10—130)

This invention relates to a threading machine, and more particularly to such a machine for cutting multiple-edge nuts or nuts of similar profile. The invention is distinguished from machines of similar type by a much more simplified construction and especially by a very simple control of its various elements. While requiring very little space, the new machine is very easily adapted to the different requirements of cutting nuts, both as regards the sizes and profiles of the nuts as well as the number of spindles which can be used. Easy accessibility and exchangeability of the various components facilitates the operation of the machine. A special kind of automatic control mechanism reduces the period between the completion of one nut and the beginning of the next to a minimum. The simplicity of the control and the arrangement of the components also permits at reduced expense a considerable increase in the number of spindles which can be used, thus producing a further increase in efficiency for any given machine size without increasing the amount of service required.

The automatic nut threading machine according to the invention operates by the overrun boring principle which is known as such and according to which the predrilled nut blanks are supplied to a rotating threading tool by means of a nut holder. However, whereas in prior machines of this type, the spindle in the boring or spindle head moves toward the nut which is secured against rotation by a gripping device, and is retracted therefrom after the cutting process, the nut holding device according to the invention consists of a reciprocating member which in its rearward position receives the nut blank as it is fed from a hopper or similar container, in a pocket which opens for this purpose during the return movement, then locks the blank against rotation during its forward movement and then moves the blank gradually over the rotating but axially stationary threading tool, and finally returns to its rearward position after the threading operation is completed. Thus, except for its rotation, the boring spindle need not move, and since the nut holder merely by its reciprocating movement carries out all the steps of receiving, locking and feeding the nut over the threading tool, the operation and control of the machine is very simple and easily adaptable to various types of nuts.

Such purely axial movement of the nut holder is produced in forward or feeding direction by a feeding spring and in rearward direction by a retracting mechanism. The feeding spring thus always automatically adapts the speed of the threading operation to the respective working conditions. The retracting mechanism is controlled by a tracer or similar sensitive element which is actuated when the nut holder reaches its most forward position so as to start the retracting movement immediately after the threading operation has been completed. The nonproductive time as well as the total floor-to-floor time are thereby reduced considerably.

The above idea may be carried out by providing the retracting mechanism with a clutch which is engaged for one rotation as soon as the tracer drops off so as to actuate a cam which quickly returns the nut holder and, after taking up the nut blank, more slowly advances it to a point where the feed for the threading operation is taken over entirely by the action of a feeding spring in accordance with the advancing threading operation. The tracer which controls the retracting movement is adjustable to various forward positions of the nut holder and thus to different nut thicknesses. Also, the head portion of the nut holder in which the blank is locked against rotation may be easily exchanged for another in accordance with the size and shape of the nuts to be threaded. It is therefore extremely simple and easy to convert the setup of the machine from one type or size of nut to another.

The pocket for receiving the nut blanks from the hopper opens during the return of the nut holder so as to receive the next blank. At the beginning of the feeding movement, suitable springs close the pocket and simultaneously lock the blank against rotation. The nut holder may consist of a shaft or rod which is secured against rotation and pivoting and provided with an axially slideable head portion. The front part of the nut holder is hollow and provided with apertures for the escape of the chips.

The simple control of all the steps as described above merely by the reciprocating axial movement of the nut holder shafts relative to axially stationary boring spindles is of special advantage in a multiple spindle automatic in which several cutting spindles are horizontally arranged side by side of each other and opposite to a corresponding number of nut holders. Whereas the known multiple spindle automatics with reciprocating boring spindles require for their control a considerable amount of machinery and entail a high expense both of which increase with the number of spindles used, it is—as far as the control is concerned—practically immaterial for the simple reciprocation of the non-rotating nut holders how many such shaftlike holders are used. This is true particularly because the retracting movement during which the nut blanks are placed in the holder pockets, can be carried out by one and the same retracting mechanism for all holders, while the feed during the threading operation is separate for each individual nut holder through the action of the respective feeding spring. Any sort of unevenness or dissimilarity in cutting the various nuts is thus automatically taken into account. The arrangement of the spindles and nut holders side by side of each other as described above also permits the use of a single nut container or hopper extending across the entire row of holders. An agitator moving back and forth in such hopper provides for a uniform distribution of the blanks therein and for an even, uninterrupted flow of the blanks therefrom at the various vents which lie over the respective head portions of the nut holder shafts.

The tracers for the individual nut holders may be mounted for common movement on one and the same shaft so that at the end of all the feeds, i. e. at the end of the cutting operation of all the spindles, each of the tracers drops down and engages its respective clutch to actuate the retracting cam.

Further features and details of the invention may be seen from the following description of one embodiment thereof as shown in the accompanying drawings, in which—

Fig. 1 is a top view of a six-spindle automatic nut and thread cutting machine according to the present invention;

Fig. 2 is a rear view of the same machine as seen from the bottom of Fig. 1;

Fig. 5 is an enlarged vertical section through the nut holder head in closed position, i. e. in operative or cutting position;

Fig. 6 is a front view of the nut holder, likewise in closed position;

Fig. 7 is a top view of the nut holder, likewise in closed position;

Fig. 8 is a vertical section through the nut holder head similar to Fig. 5, but in open position while receiving a new nut blank from the hopper; while Fig. 9 is a cross section along line A—B of Fig. 8.

Figure 3:
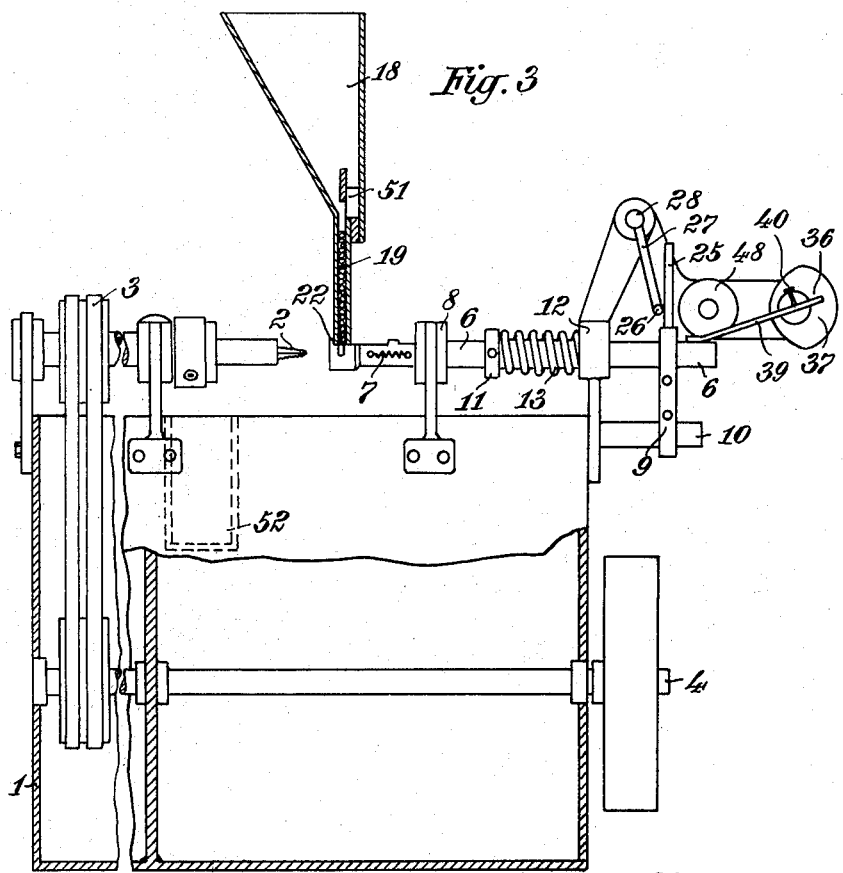
Fig. 3 is a side view thereof, looking at it from the left side of Fig. 1.

The machine frame 1 supports a set of six threading spindles 2 which are driven by an electric motor through a shaft 4 and V-bent pulleys 3. The threading spindles 2 only rotate and are stationary in axial direction. The nuts after being cut run one after another along the respective spindle and are ejected in a known manner at the end thereof so as to drop into a container 52. Every spindle has opposite thereto a nut holder which consists of a shaft-like member 6 and a head portion 7 which is axially slidable relative thereto. For sliding together in axial direction, both parts are supported by bearings 8 and 12 on the machine frame and are secured against rotary movement by a bar 9. This bar is provided with a longitudinal slot for clamping it by means of a screw to the shaft 6, while its lower end is provided with a bore for slidably mounting the bar on a rod 10. A strong feeding spring 13 which has the tendency to move the nut holder in the direction of the threading spindle, is held on shaft 6 between a flange 11 thereon and an annular bearing 12 which is mounted on the machine frame.

The hollow forward end of the shaft 6 has tightly fitting therein a tube 14 into the forward end of which the threading tool 2 may enter, while its rear end terminates in an aperture 15 through which the chips may escape from tube 14. The hollow end of the shaft 6 interlocks with the head 7 of the nut holder by means of a tongue and slot connection which prevents rotary movement between these two parts while permitting the head 7 to slide in axial direction relative to shaft 6. Two springs 16 tend to hold these two parts in fully interlocking position as shown in Figs. 5 and 7. The front end of the head 7 forms a pocket 17 which is open in upward direction and into which the front end of tube 14 extends when in basic position. Above this pocket and across the entire machine extends the hopper 18 which is common to all the nut holders of the machine. The ejecting openings or vents of its flat chutelike lower portions 19 lie above the respective receiving pockets 17, while the parts of an agitator 51 as described below reciprocate between the upper ends of the chutes 19, as shown in Fig. 3. The upper surfaces 20 of the nut holder 7 adjacent to the pocket 17 are only half as high as the head portion so as to permit the nuts to enter the pockets easily. Such construction of the head portion makes it one easily manufactured.

As shown especially in Figs. 8 and 9, the upper part of the forward end of the head 7 above the tube 14 is made entirely flat and forms a shoulder 21 which extends into a tongue which is guided on shaft 6. At the front end, the head 7 has an upward projection 22 which extends above the surface of the flat part. This end portion with the projection 22 has an opening 23 of a shape corresponding to the outer profile of the nut to be worked on, but of slightly larger size so that the nut can enter easily but is then locked therein against rotation. The wall of this opening has an aperture 24 toward the bottom to permit the chips to escape. The nut which is held in the opening 23 thus rests on the surfaces adjacent to the aperture 24. The lower end of the front wall of the chute 19 touches against the rear surface of the projection 22 and retains it together with the head 7 when the remaining part of the nut holder is retracted, as will be described below.

Figure 4:
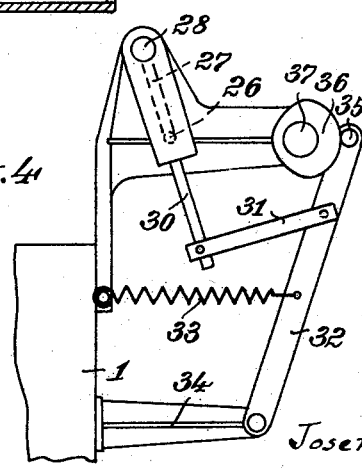
Fig. 4 is a side view of certain details of the retracting mechanism.

Near the rear end of the shaft 6 is an upwardly projecting arm 25 which, in the embodiment of the invention shown in the drawings, extends from the bar 9 which secures the shaft 6 against rotation. This arm is engaged by the retracting mechanism shown in a side view in Figs. 3 and 4. The nut holder is retracted by means of a rod 26 which extends across the entire machine and is supported by arms 27 of a shaft 28. This shaft turns in a bearing 29 and has secured thereto an actuating arm 30 which is connected through a lever 31 to a draw bar 32. This bar is pivoted at its lower end on a bracket 34 on the machine frame and is acted upon by a spring 33 which tends to pivot the bar forwardly. At its upper end, bar 32 carries a roller 35 which is pressed by a spring 33 against a cam 36 on a shaft 37 which extends across the entire width of the machine and is rotatable in bearings, such as 38, which are mounted on the machine frame. Shaft 37 carries adjustable tracers 39 which are secured by screws 40. There is one tracer provided for each nut holder, and each tracer rests upon the rear end of the shaft 6, for example under the action of its own weight and that of a friction clutch or one of similar type, as described below.

If, as later described in detail, at the end of the cutting process the nut holder has been sufficiently advanced by the feeding spring 13, the tracer drops off the rear end of the shaft 6 causing a rotary movement of shaft 37 which is transmitted through a friction clutch (not shown) to a sleeve 41 carrying a cam disc 42 which is engaged by a finger 43. An inner clutch spring (not shown) may now engage a clutch 44 which may be of the following construction:

The right end of shaft 37 carries loosely rotatable thereon a sleevelike portion 45 which is rotated continuously, secured against axial movement relative to the shaft, and supported by a bearing 46 which is mounted on the machine frame.

The sleeve 45 is driven through gears 47 or the like by a small electric motor mounted on the machine frame. Toward its outer end, sleeve 45 carries a cam disc 49 which transmits a reciprocating movement to a system of levers 50. These levers actuate an agitator 51 to move back and forth in the nut hopper 18 and to provide for a uniform distribution of the nut blanks and their uniform supply to the chutes 19. The continuously rotating sleeve portion 45 which rotates the cam 49 for moving the agitator 51 back and forth, carries on its inner end the driving part of the clutch 44 which is shown as being of the serrated variety. The driven part of this clutch is secured to the sleeve 41 which is axially slidable on shaft 37 but rotates therewith. The main part of this shaft is connected with the sleeve portion 41 by means of the friction clutch previously mentioned so that when the tracer 39 drops off the end of the nut holder, it executes a small rotary movement until the finger 43 moves off the projecting portion of cam 42. Now, the inner clutch spring (not shown) is able to slide the sleeve portion 41 slightly to the right so that the two serrated discs of clutch 44 engage each other and shaft 37 executes one positive rotation until cam disc 42 moves against the finger 43 and again disengages the clutch.

While shaft 37 is thus rotated, the cam disc 36 which is mounted on the other end of the shaft, also rotates and thereby presses against the roller 35 (Fig. 4) and pivots the levers 32, 31, and 30, so as to turn the shaft 28 as well as the arms 27 thereon. Thereby the rod 26 extending between these arms retracts the nut holders 6, 7 through the arms 25. The heads of the nut holders which during the cutting process had moved the nuts over the threading tools 2, are thus withdrawn therefrom.

During this retracting movement, the lowest nut in the chute 19 of hopper 18 first slides along the upper flat portion of the head 7 until the projecting portion 22 hits against the end of the chute. The head is thereby held back and the shaft portion 6 alone continues the retracting movement. The springs 16 are thereby tightened and parts 6 and 7 of the nut holder are drawn apart. The further retraction of the tube 14 which is secured within the shaft 6, then causes the pocket which is formed in the head portion of the nut holder to open so that the lowest nut can drop from the chute past the front end of tube 14 and into the pocket (Fig. 8).

In the meantime, the highest portion of cam disc 36 has passed the roller 35, the feeding movement of the nut holder starts, the springs 16 close the pocket, and the nut blank in the pocket is inserted by the advancing tube 14 into the profiled portion 23 at the end of the head and thereby locked against rotation (Fig. 5). Then, the feeding spring 13 pushes the entire nut holder with the nut therein against the threading tool 2 until the cutting process is completed and the tracer 39 which has been adjusted in accordance with the length of the thread of the tool, again drops off the rear end of the shaft 6, and the next retracting cycle begins. However, since all tracers sit on the same shaft 37, the retracting movement cannot start until all tracers are released so that, even if the cutting action of the individual spindles should not be uniform, no damage will be caused by retracting the nut holder too soon.

The time required for the cutting process and for repeating it depends upon the cutting speed, the size of the thread to be cut, the length of the thread on the tool, and the pitch of the thread.

The rotary drive of the bearing spindle does not need to be described in detail as it is known in the so-called overrun borers. It is sufficient to state that the shaft of the spindle has a bent portion or knee by means of which the rotary movement of the tap holder is transmitted to the threading tool. In such a manner it is possible to leave the end of the rotating shaft opposite the boring head free for the removal of the threaded nuts. Before beginning to work, the shaft is filled with nuts, that is, a sufficient supply of nuts is slid on the shaft and the shaft together with the nuts is then inserted into the opening of the tap holder which is made of adequate size for this purpose. However, this type of drive of an overrun borer or tap is known as such and does not form a part of this invention.

Having thus described the invention, I claim:

1. A nut threading machine comprising a plurality of threading tools, means for rotatably mounting said tools in a fixed position in axial direction thereof, means for rotating said tools, a plurality of spindles, a nut holder on each of said spindles having an aperture adapted to receive a nut blank and secure the same against rotary movement, means for non-rotatably mounting said spindles, means for advancing said spindles and nut holders individually toward said threading tools in axial direction thereof for threading said nuts, means for retracting all of said spindles and nut holders, and individual tracing means responsive to the fully advanced position of each of said nut holders for automatically actuating said retracting means for retracting all of said spindles simultaneously when all of said spindles and nut holders have arrived in their individual fully advanced positions and all of said nuts have been fully threaded.

2. A nut threading machine comprising a plurality of threading tools, means for rotatably mounting said tools in a fixed position in axial direction thereof, a plurality of spindles, a nut holder on each of said spindles having an aperture adapted to receive a nut blank and secure the same against rotary movement, means for supplying nut blanks to said nut holders, means for non-rotatably mounting said spindles, means for advancing said spindles and nut holders individually toward said threading tools in axial direction thereof for threading said nuts, said advancing means comprising at least one spring on each of said spindles, means for retracting all of said spindles and nut holders, and individual tracing means acting upon each of said spindles and responsive to the fully advanced position of each of said nut holders for automatically actuating said retracting means to retract all of said spindles simultaneously when all of said nut holders have arrived in their individual fully advanced position and all of said nuts have been fully threaded.

3. A nut threading machine comprising a plurality of threading tools, means for rotatably mounting said tools in a fixed position in an axial direction thereof, a plurality of spindles, a nut holder on each of said spindles having an aperture adapted to receive a nut blank and secure the same against rotary movement, means for supplying nut blanks to said nut holders, means for non-rotatably mounting said spindles, means for advancing said spindles and nut holders individually toward said threading tools in axial direction thereof for threading said nuts, means for retracting all of said spindles and nut holders, a common shaft for all of said retracting means, driving means, a one-revolution clutch connecting said driving means with said shaft, and individual tracing means acting upon each of said spindles and responsive to the fully advanced position thereof for engaging said clutch so as to retract all of said nut holders simultaneously when all of said spindles and nut holders have arrived in their individual fully advanced position and all of said nuts have been fully threaded.

4. A nut threading machine comprising a plurality of threading tools, means for rotatably mounting said tools in a fixed position in an axial direction thereof, means for driving said tools, and a nut feeding mechanism comprising a plurality of spindles, a nut holder on each of said spindles having an aperture adapted to receive a nut blank and secure the same against rotary movement, means for supplying nut blanks to said nut holders, means for non-rotatably mounting said spindles, means for advancing said spindles and nut holders individually toward said threading tools in axial direction thereof for threading said nuts, said advancing means comprising at least one spring on each of said spindles, means for retracting all of said spindles and nut holders comprising an arm on each of said spindles, a rod extending transversally of said spindles and adapted to engage all of said arms, means for pivotally mounting said rod, driving means, a one-revolution clutch adapted to connect said driving means with said pivoting means, individual tracing means engaging said spindles when in retracted position and adapted to be automatically released therefrom when said spindles have reached their fully advanced position, a common shaft for mounting all of said tracing means, and means on said shaft for automatically engaging said clutch when all of said tracing means have been released from said spindles for simultaneously retracting all of said spindles and nut holders.

5. A nut threading machine comprising a plurality of threading tools, means for rotatably mounting said tools in a fixed position in an axial direction thereof, means for driving said tools, and a nut feeding mechanism comprising a plurality of spindles, a nut holder on each of said spindles, means for supplying nut blanks to said nut holders, each of said nut holders having an aperture adapted to receive a nut and secure the same against rotary movement, means for non-rotatably mounting said spindles, means for advancing said spindles and nut holders individually toward said threading tools in axial direction thereof for threading said nuts, said advancing means comprising at least one feeding spring on each of said spindles, means for retracting all of said spindles and nut holders comprising an arm on each of said spindles, a rod extending transversally of said spindles and adapted to engage all of said arms, means for pivotally mounting said rod, individual tracing means engaging said spindles when in retracted position and adapted to be automatically released therefrom when said spindles have reached their fully advanced position, a common shaft for mounting all of said tracing means, driving means, a one-revolution clutch adapted to connect said driving means with said shaft, means on said shaft for automatically engaging said clutch when the last of said tracing means has been released from said spindles so as to rotate said shaft for one revolution, and a cam on said shaft for actuating said pivoting means for simultaneously retracting all of said spindles and nut holders during said one revolution of said shaft.

6. A nut-threading machine comprising a plurality of threading tools, means for rotatably mounting said tools in a fixed position in an axial direction thereof, means for driving said tools, and a nut feeding mechanism comprising a plurality of spindles, a nut holder on each of said spindles, means for supplying nut blanks to said nut holders, each of said nut holders having an aperture adapted to receive a nut and secure the same against rotary movement, means for non-rotatably mounting said spindles, means for advancing said spindles and nut holders individually toward said threading tools in axial direction thereof for threading said nuts, said advancing means comprising at least one feeding spring on each of said spindles, means for retracting all of said spindles and nut holders comprising an arm on each of said spindles, a rod extending transversally of said spindles and adapted to engage all of said arms, means for pivotally mounting said rod, individual tracing means engaging said spindles when in retracted position and adapted to be automatically released therefrom when said spindles have reached their fully advanced position, a common shaft for mounting all of said tracing means, driving means, a one-revolution clutch adapted to connect said driving means with said shaft, means on said shaft for automatically engaging said clutch when the last of said tracing means has been released from said spindles so as to rotate said shaft for one revolution, and a cam on said shaft for actuating said pivoting means for quickly and simultaneously retracting all of said spindles and nut holders, and for then retarding the action of said feeding spring during the early part of the advancing movement of said spindles.

7. A nut threading machine comprising a plurality of threading tools, means for rotatably mounting said tools in a fixed position in an axial direction thereof, means for driving said tools, and a nut feeding mechanism comprising a plurality of spindles, a nut holder on each of said spindles, means for supplying nut blanks to said nut holders, each of said nut holders having an aperture adapted to receive a nut and secure the same against rotary movement, means for non-rotatably mounting said spindles, means for advancing said spindles and nut holders individually toward said threading tools in axial direction thereof for threading said nuts, said advancing means comprising at least one feeding spring on each of said spindles, means for retracting all of said spindles and nut holders comprising an arm on each of said spindles, a rod extending transversally of said spindles and adapted to engage all of said arms, means for pivotally mounting said rod, individual tracing means engaging said spindles when in retracted position and adapted to be automatically released therefrom when said spindles have reached their fully advanced position, a common shaft for mounting all of said tracing means, means for adjusting the position of said tracing means on said shaft relative to said spindles for controlling the extent of movement of said spindles, driving means, a one-revolution clutch adapted to connect said driving means with said shaft, means on said shaft for automatically engaging said clutch when the last of said tracing means has been released from said spindles so as to rotate said shaft for one revolution, and a cam on said shaft for actuating said pivoting means for simultaneously retracting all of said spindles and nut holders during said one revolution of said shaft.

8. A nut threading machine comprising a plurality of threading tools, means for rotatably mounting said tools in a fixed position in an axial direction thereof, means for driving said tools, and a nut feeding mechanism comprisng a plurality of spindles, a nut holder on each of said spindles, means for supplying nut blanks to said nut holders, each of said nut holders having an aperture adapted to receive a nut and secure the same against rotary movement, means for non-rotatably mounting said spindles, means for advancing said spindles and nut holders individually toward said threading tools in axial direction thereof for threading said nuts, said advancing means comprising at least one feeding spring on each of said spindles, means for retracting all of said spindles and nut holders comprising an arm on each of said spindles, a rod extending transversally of said spindles and adapted to engage all of said arms, means for pivotally mounting said rod, individual tracing means engaging said spindles when in retracted position and adapted to be automatically released therefrom when said spindles have reached their fully advanced position, a common shaft for mounting all of said tracing means, means of adjusting the length of said tracing means for controlling the length of the advancing movement of said spindles, driving means, a one-revolution clutch adapted to connect said driving means with said shaft, means on said shaft for automatically engaging said clutch when the last of said tracing means has been released from said spindles so as to rotate said shaft for one revolution, and a cam on said shaft for actuating said pivoting means for simultaneously retracting all of said spindles and nut holders during said one revolution of said shaft.

9. A nut threading machine comprising a plurality of threading tools, means for rotatably mounting said tools in a fixed position in an axial direction thereof, means for rotating said tools, and a nut feeding mechanism comprising a plurality of spindles, a nut holder on each of said spindles, adapted to secure a nut therein against rotary movement, means for supplying nut blanks to said nut holders including a hopper, means for non-rotatably mounting said spindles, means for advancing said spindles and nut holders individually toward said threading tools in axial direction thereof for threading said nuts, said advancing means comprising at least one feeding spring on each of said spindles, means for retracting all of said spindles and nut holders comprising an arm on each of said spindles, a rod extending transversally of said spindles and adapted to engage all of said arms, means for pivotally mounting said rod, individual tracing means engaging said spindles when in retracted position and adapted to be released therefrom when said spindles have reached their fully advanced position, a common shaft for mounting all of said tracing means, driving means, a one-revolution clutch adapted to connect said driving means with said shaft, means on said shaft for automatically engaging said clutch when the last of said tracing means has been released from said spindles so as to rotate said shaft for one revolution, a cam on said shaft for actuating said pivoting means for simultaneously retracting all of said spindles and nut holders during said one revolution of said shaft, each of said nut holders having an aperture therein adapted to receive a nut blank from said hopper during the retracting movement of said nut holder, and means for closing said aperture at the beginning of the advancing movement of said holder.

10. A nut threading machine comprising a plurality of threading tools, means for rotatably mounting said tools in a fixed position in an axial direction thereof, means for rotating said tools, and a nut feeding mechanism comprising a plurality of spindles, a nut holder on each of said spindles adapted to secure a nut therein against rotary movement, means for supplying nut blanks to said nut holders including a hopper, means for non-rotatably mounting said spindles, means for advancing said spindles and nut holders individually toward said threading tools in axial direction thereof for threading said nuts, said advancing means comprising at least one feeding spring on each of said spindles, means for retracting all of said spindles and nut holders comprising an arm on each of said spindles, a rod extending transversally of said spindles and adapted to engage all of said arms, means for pivotally mounting said rod, individual tracing means engaging said spindles when in retracted position and adapted to be released therefrom when said spindles have reached their fully advanced position, a common shaft for mounting all of said tracing means, driving means, a one-revolution clutch adapted to connect said driving means with said shaft, means on said shaft for automatically engaging said clutch when the last of said tracing means has been released from said spindles so as to rotate said shaft for one revolution, a cam on said shaft for actuating said pivoting means for simultaneously retracting all of said spindles and nut holders during said one revolution of said shaft, each of said nut holders comprising a part having an aperture therein adapted to receive a nut blank from said hopper during the retracting movement of said nut holder, means for closing said aperture at the beginning of the advancing movement of said holder, and a front part for securing said nut blank against rotary movement, said front part being exchangeable and shaped in accordance with the size and shape of the nut blanks to be threaded.

11. A nut threading machine comprising a plurality of threading tools, means for rotatably mounting said tools in a fixed position in an axial direction thereof, means for rotating said tools, and a nut feeding mechanism comprising a plurality of spindles, a nut holder on each of said spindles, adapted to secure a nut therein against rotary movement, means for supplying nut blanks to said nut holders including a hopper, means for non-rotatably mounting said spindles, means for advancing said spindles and nut holders individually toward said threading tools in axial direction thereof for threading said nuts, said advancing means comprising at least one feeding spring on each of said spindles, means for retracting all of said spindles and nut holders comprising an arm on each of said spindles, a rod extending transversally of said spindles and adapted to engage all of said arms, means for pivotally mounting said rod, individual tracing means engaging said spindles when in retracted position and adapted to be released therefrom when said spindles have reached their fully advanced position, a common shaft for mounting all of said tracing means, driving means, a one-revolution clutch adapted to connect said driving means with said shaft, means on said shaft for automatically engaging said clutch when the last of said tracing means has been released from said spindles so as to rotate said shaft for one revolution, a cam on said shaft for actuating said pivoting means for simultaneously retracting all of said spindles and nut holders during said one revolution of said shaft, each of said nut holders having an aperture therein adapted to receive a nut blank from said hopper during the retracting movement of said nut holder, means for closing said aperture at the beginning of the advancing movement of said holder, said hopper extending transversally of all of said nut holders, and stirring means actuated by said driving means for uniformly distributing and feeding said nut blanks to said aperture in each of said nut holders.

12. A nut threading machine comprising a plurality of threading tools, means for rotatably mounting said tools in a fixed position in axial direction thereof, a plurality of spindles, a nut holder on each of said spindles having an aperture adapted to receive a nut blank and secure the same against rotary movement, means for supplying nut blanks to said nut holders, means for non-rotatably mounting said spindles comprising an arm secured to each of said spindles, a shaft spaced from but parallel with said spindle, said arm being slidably mounted on said shaft, means for advancing said spindles and nut holders individually toward said threading tools in axial direction thereof for threading said nuts, said advancing means comprising at least one spring on each of said spindles, the spaced mounting of said arm on said shaft cooperating with said advancing means so as to relieve said spindle from the rotary forces exerted thereon during the threading operation and transmit the same to said shaft, means for retracting all of said spindles and nut holders comprising a rod extending transversally of said spindles and adapted to engage all of said arms, means for pivotally mounting said rod, and individual tracing means acting upon each of said spindles and responsive to the fully advanced position of each of said nut holders for automatically pivoting said rod to retract all of said spindles simultaneously when all of said nut holders have arrived in their fully advanced positions and all of said nuts have been fully threaded.

References Cited in the file of this patent

UNITED STATES PATENTS 810,054    Hintlian _____ Jan. 16, 1906